United States Patent
Tournier et al.

[11] 3,971,893
[45] July 27, 1976

[54] CONTROL SYSTEM AND PROCESS FOR A SPACE-DIVISION SWITCHING NETWORK

[75] Inventors: Christian Yves Tournier; Jean Bernard Kerihuel, both of Paris, France

[73] Assignee: International Standard Electric Corporation, New York, N.Y.

[22] Filed: July 28, 1975

[21] Appl. No.: 599,354

Related U.S. Application Data
[63] Continuation of Ser. No. 408,598, Oct. 23, 1973.

[30] Foreign Application Priority Data
Oct. 31, 1972  France .............................. 72.38597

[52] U.S. Cl. .......................... 179/18 GE; 340/166 S
[51] Int. Cl.² .......................................... H04Q 9/00
[58] Field of Search ..................... 179/186 E, 186 F; 340/166 C, 166 S

*Primary Examiner*—Kathleen H. Claffy
*Assistant Examiner*—C. T. Bartz
*Attorney, Agent, or Firm*—J. B. Raden; D. P. Warner

[57] ABSTRACT

Controls are provided for a space-division switching network with relay crosspoint matrices, each crosspoint having four switching coils or windings. A crosspoint relay is switched when two pairs of pulses are provided simultaneously, one pulse to each winding. The switch control arrangement (called the selection unit) for each row and column conductor includes two thyristors, one at each end of the row or column with rows and columns being paired, the pairing being with columns or rows in other planes of the stage.

10 Claims, 11 Drawing Figures

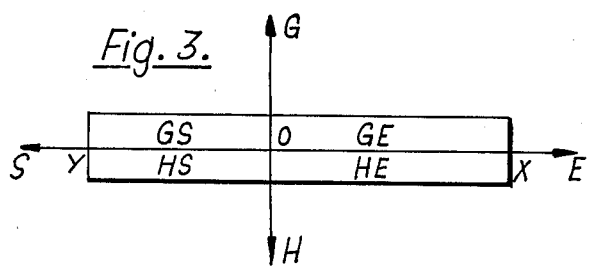
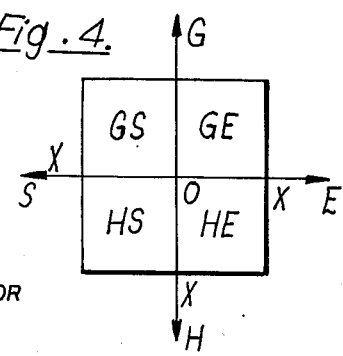
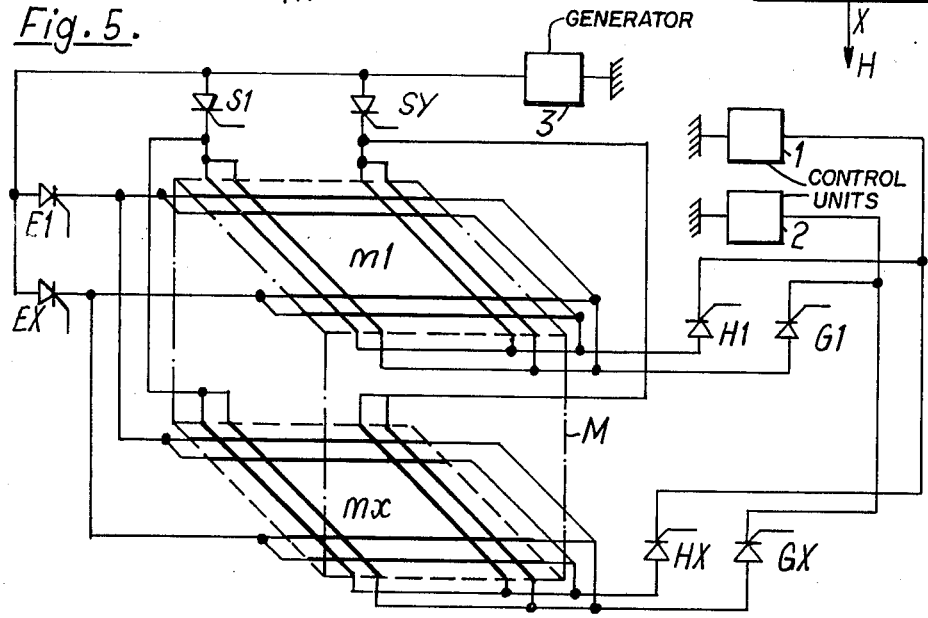
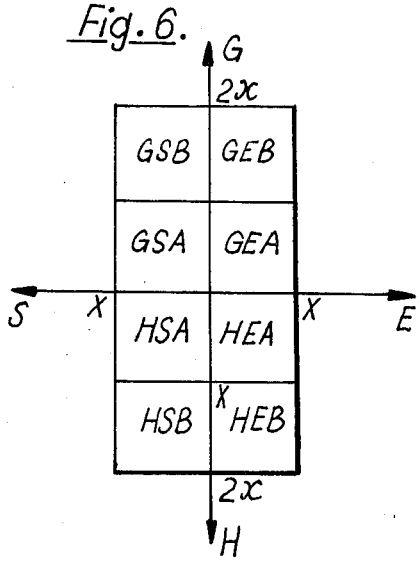
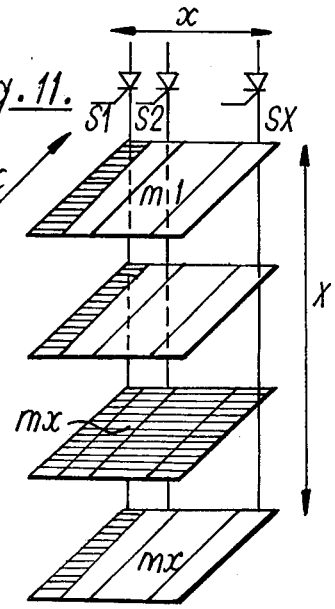

CONTROL SYSTEM AND PROCESS FOR A SPACE-DIVISION SWITCHING NETWORK

This is a continuation of application Ser. No. 408,598 filed Oct. 23, 1973.

BACKGROUND OF THE INVENTION

1. Field of The Invention.

The present invention relates to a system and a process for controlling a space-division switching network.

The system and process according to this invention apply to networks having crosspoints which each have four coils switching their respective contacts. In particular, they apply to networks wherein crosspoints are electromagnetically controlled by means of current pulses supplied to the coils and are magnetically held according to a method such as that described in the French patent No. 1,393,336, corresponding to the U.S. Pat. No. 3,524,167.

2. Description of the Prior Art.

In numerous known switching systems, crosspoints include two contacts coupled to speech leads and a control contact which makes it possible to test crosspoint condition and to detect operation faults, if any.

In present systems and, particularly, in sealed contact systems, those faults occur rarely and are all substantially caused by electric failures in control system circuits or by lacks of continuity in connections and crosspoint switching coils.

Thus, crosspoint control contacts may be suppressed to the extent that components possibly affected by failures are controlled. In large-size central control space-division switching systems, the use of two-contact crosspoints results in important volume and cost savings.

Implementation of large size networks obviously is very expensive due to the number of utilized components. For reasons having to do with cost reduction and control, it as apparent to be of great interest to find an arrangement permitting a reduction in the number of items by using common items, which as a consequence reduces to the same extent the number of test items and makes possible more careful and systematic control.

SUMMARY OF THE INVENTION

Therefore, a purpose of the present invention is to provide a control system for use in a space-division multistage switching network, such a network including matrices and crosspoints provided with four switching coils, each coil belonging to a different category, the coils being so arranged that coils of the same category switching the various crosspoints in a row or a column of a matrix plane are connected to form a row winding or a column winding, depending on the configuration of the concerned crosspoints, the crosspoint switching being produced by means of four pulses or two pairs of pulses, pulses of a pair having the same value and the four pulses being simultaneously applied to the coils of the concerned crosspoint.

According to a feature of this invention, within a stage, any winding is selected by means of two selection units, when that winding is involved in crosspoint switching. The two winding selection units are each respectively connected to a different end of that winding, one being relative to either the row rank or the column rank common to crosspoints whose coils form the concerned winding and the other being related to the value of the switching pulse applied to the concerned winding. Any selection unit related to either a row rank or a column rank is, on the one hand, common to two windings respectively formed of coils of a different category which are respectively located on the same points of a row in the matrix plane, those two windings being alloted to the rank of those points, and, on the other hand, common to each pair of coils having an identical rank in the different matrix planes of the stage.

Any selection unit related to a pulse value is allotted to only one matrix plane in a stage and is connected, for each selection circuit associated to that stage, to one of the two windings which are connected to that rank selection circuit in the concerned plane.

According to another feature of this invention, selection units are divided into two groups. One group comprises rank selection units and the other comprises pulse value selection units. On the one hand, selection units in a group are at least partially common to at least two stages of the network, and, on the other hand, two stages of the network have in common at most selection units of only one group of selection units.

According to another feature of this invention, each selection unit is a thyristor fired through its gate when a winding connected to one of its two other electrodes is selected, so as to pass the switching pulse to the said winding, via the said two other electrodes.

According to another feature of this invention, a control process is provided wherein crosspoint switching on includes the following operations; firing each of the four selection thyristors connected to the four windings including the coils of the crosspoint to be switched on; holding these thyristors by holding currents passing through their respective anodes and cathodes, the holding currents being negligible in comparison with the control pulses previously applied thereto; and simultaneous triggering by use of four control pulses, each pulse being applied to a different winding and one pair of pulses being controlled by two controls, each control determining the time when the pair of pulses is to be applied, and the other control determining the duration and the current of those two pulses in each pair.

BRIEF DESCRIPTION OF THE DRAWINGS

Other features of this invention will appear more clearly from the following description of an embodiment, the said description being made in conjunction with the accompanying drawings, wherein:

FIG. 3 is a diagram illustrating how selection circuits are distributed in a crosspoint control arrangement according to FIG. 2, FIG. 4 is a diagram illustrating how selection units are distributed in a three dimensional matrix arrangement, FIG. 5 is a basic diagram of an arrangement according to FIG. 4, FIG. 6 is a diagram illustrating how selection units are distributed in a two-stage switching network, each stage including an arrangement according to FIG. 5, FIG. 11 is a diagram of an example of an arrangement of involved areas by short-circuiting a diode in a stage.

DESCRIPTION OF A PREFERRED EMBODIMENT

The hereinafter described control system applies to space-division switching network including one or several stages comprised of crosspoint matrices, each stage being, in a first approximation, considered as similar to a single matrix.

In a known manner, in a matrix, a crosspoint is proposed for connecting a given input among Xs of that matrix to a given output among Ys. Assuming that $x$ and $y$ respectively are ranks of the input and output connected to that crosspoint, its position in the matrix is completely determined if its coordinates $x$ and $y$ are known, such as for point P1y in FIG. 1.

Still in a known manner, matrices are so designed that any crosspoint in a matrix is only switched "on" after all the crosspoints which have the same row rank as it -that is connected to the same input- and which have the same column rank as it -that is connected to the same output- in the considered matrix, have been reset.

In the case of four coil crosspoint matrices which are operated according to the principle described in U.S. Pat. No. 3,524,176, it is known that the above results are produced by a specific coil arrangement and by the control type. The specific arrangement is so designed that the coils, symetrically at the points of a row or a column, respectively, are serially connected in a row winding or a column winding, a point being determined by the four windings including those coils. The control is pulsed and is simultaneously applied to the four windings, which determine a point, two of those windings being subject to a long pulse and the two others to a short pulse.

Figure 1:
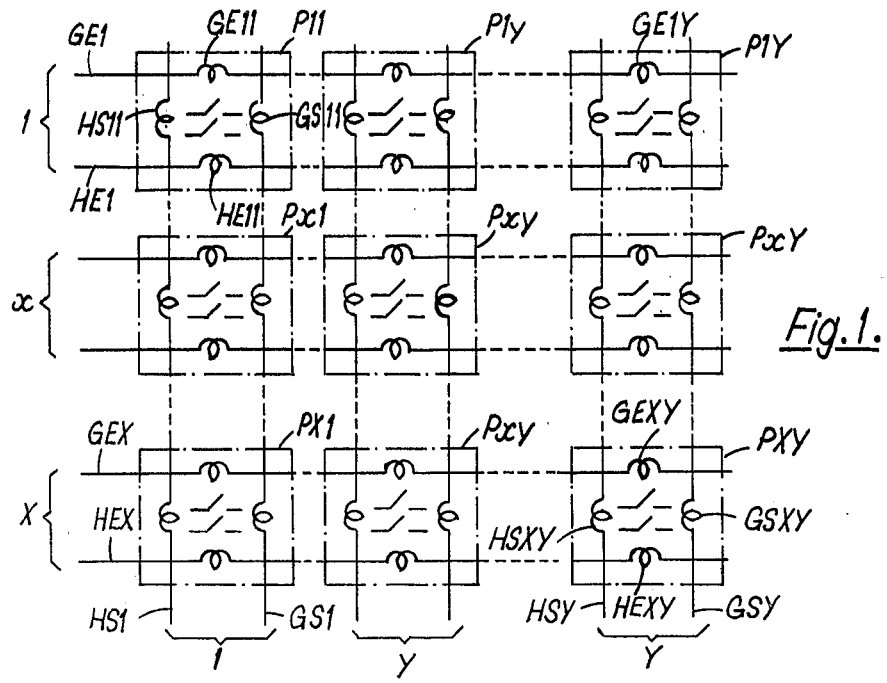
FIG. 1 is a schematic diagram of the arrangement of control windings in a plane matrix arrangement of crosspoints, each of which is controlled by four coils.

FIG. 1 shows an example of such an arrangement of a crosspoint matrix having X rows and Y columns of crosspoints P such as P11, P1Y . . . PXY. The identical windings of a single row as GE11 . . . GE1Y are serially connected and there are two row windings having indexes GE and HE per crosspoint matrix row and two column windings having indexes GS and HS per crosspoint matrix column.

It will be assumed that windings having long pulses, and GS, such as GE1 and GS1, are subject to long pulses and windings having indexed HE and HS, such as HSY and HEX, are subject to short pulses so as to meet crosspoint operation conditions. Thus, each winding may be defined by two conditions, one relative to its rank, and the other to the duration of the pulse applied thereto. Thus, there are four distinct winding groups for a crosspoint matrix. The first group GE comprises row windings subject to pulses, the second group GS comprises column windings subject to long pulses, the third group HE comprises row windings subject to short pulses, and the fourth group HE comprises column windings subject to short pulses. Groups GE and HE each have a total of X windings while groups GS and HS each have a total of Y windings. Thus, theoretically, 4(X+Y) selection units would be needed for selecting one of the XY crosspoints in a matrix by means of the windings including the concerned coils. In a known manner, the number of selection units is reduced down to X+Y+2 by alloting a same selection unit E to two windings respectively selected, one in the group GE and the other in the group HE, by alloting the same unit S to two windings respectively selected, one in the group GS and the other in the group HS, and by alloting a selection unit G to groups GE and GS, and a selection unit H to groups HE and HS, which makes it possible to produce the conventional arrangement shown in FIG. 2.

Figure 2:
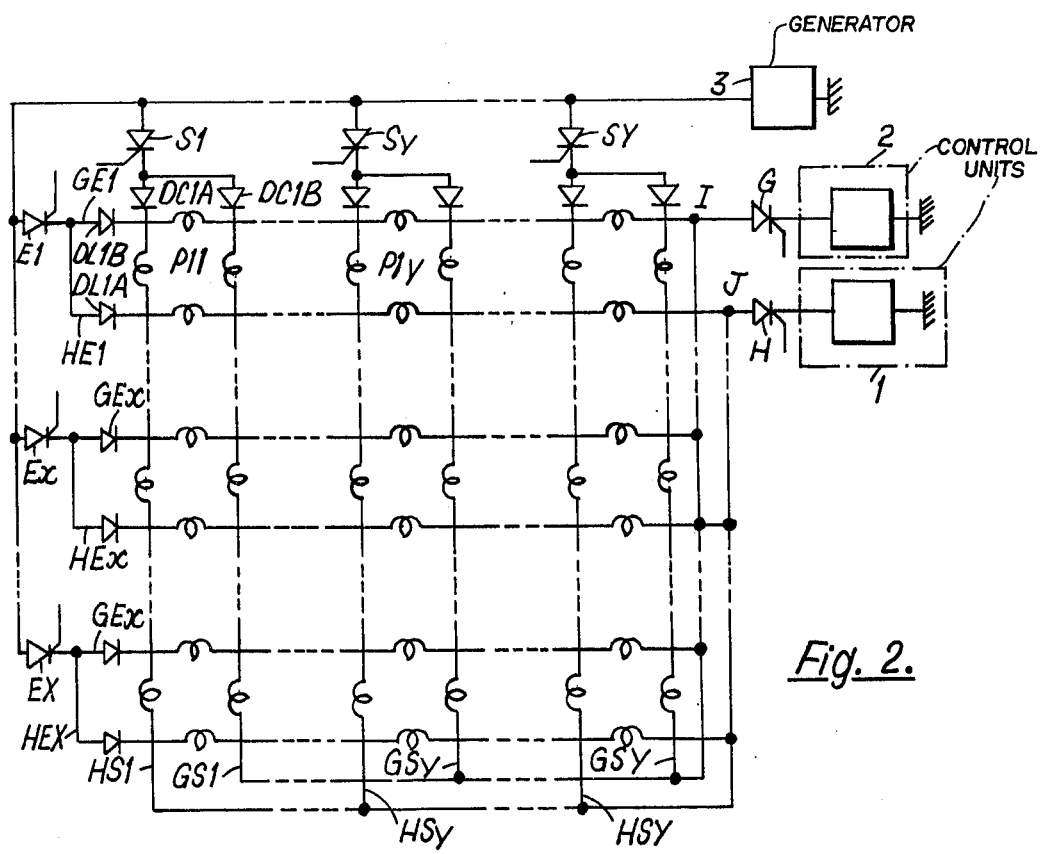
FIG. 2 is a schematic diagram of a control arrangement, according to this invention, applied to one of the matrix planes in a switching network control system.

In the example shown in FIG. 2, selection units are thyristors, which are serially connected to windings that they have to control. Each winding is mounted between two thyristors, one thyristor for selection of rank E or S, and another for selection of duration H or G. In the described embodiment, thyristors E and S have their anodes connected to a generator 3 and their cathodes to a winding terminal, via a diode D, such as DC1A or DL1B. Thyristors G have their anodes connected to windings of indexes GE and GS, and thyristors H have their anodes connected to winding of indexes HE and HS. The gates of those thyristors allow their selection according to principles known to the man skilled in the art. Control of pulse trigger time, current and duration is provided by a control unit of a limiter amplifier type, such as 1 for H and 2 for G.

However, it is to be noted that selection of a winding by means of selection units directly connected to its ends also applies to all parallel electric connections which are constituted by serially connecting several windings and whose ends are connected to the selection circuits connected to the selected winding, such as the connection formed of windings HE1, HEX, GEX mounted in parallel with winding GE1 between selection circuit terminals E1 and G.

But, those parallel electric connections each have at least one winding which, in that parallel operation, passes a current in a reciprocal direction with respect to that flowing through it, when it is directly selected. Thus, it is sufficient to preclude, by means of diodes such as DC1A, DC1B . . . DL1A, DL1B, that reciprocal current from flowing through those windings to be sure that only one winding is selected at once.

The arrangement of the selection units shown in FIG. 2 and hereabove determined may be symbolized in FIG. 3, wherein shown are groups GE, HE, GS and HS. They are paired by their common selection units G, H, E and S, so as to form a system according to the invention.

To the extent that the number of selection units is to be reduced for a matrix having X rows and Y columns, it appears of interest that $X = Y$, since, in that case, the sum $X + Y$ is the smallest possible with respect to the selected product XY, which inclines to select a square crosspoint matrix.

The selection of a winding in a group, for instance GE, is an operation which may be referred to as a type 1 out $n$ operation which may be made in a matrix form if it is desired to reduce the number of circuits needed for, that number being reduced from $n$ to $\sqrt{n}$, if number $n$ is a perfect square.

Therefore, with X units and E and $Y = X$ units S, it is desirable to have X units G and X units H to provide an optimum configuration of the selection units, the units configuration being then shown in FIG. 4. In that case, the crosspoint matrix has three dimensions and may be represented in the form shown in FIG. 5. That crosspoint matrix H is a cubic matrix having three dimensions equal to X. Thus, it is made of X matrix planes m, such as m1 or mX, each plane having X rows and X columns. Matrix M is then controlled in the previously described manner by means of 4X selection units E, S, G or H and two control units 1 and 2. Likely, it is to be noted that groups GE, GS, HE and HS are also in the form of square matrices.

In the described embodiment, matrix M groups all the crosspoints of a stage.

In the case of a multistage switching network, the number of selection units may be reduced with respect to the number resulting from the use of an arrangement such as above described for matrix M, for each stage, if the different stages of the network may be sequentially controlled, that is non simultaneously controlled.

Indeed, as shown in FIG. 6, in a two-stage network having X selection units E and X selection units S, two stages may be controlled which are respectively each formed of a matrix X, with 2X selection units G and 2X units H, that is with 6X selection units instead of 8X.

Obviously, the above is also possible by reversing the functions of E and S with respect to those of G and H.

It appears obvious that circuit saving will be maximum if the number of matrices M is a perfect square. Thus, in the case of four stages, 8X selection circuits may theoretically provide the control of $4X^3$ crosspoints grouped in four stages, each having at most $X^3$ crosspoints. As a fact, as hereafter described, the number of controlled crosspoints is usually smallest if number X is high, that is the network is a large size network.

Moreover, mullistage networks usually include stages of different sizes with the purpose of expansion or concentration, which may result in an incomplete utilization of the system possibilities.

Figure 7:
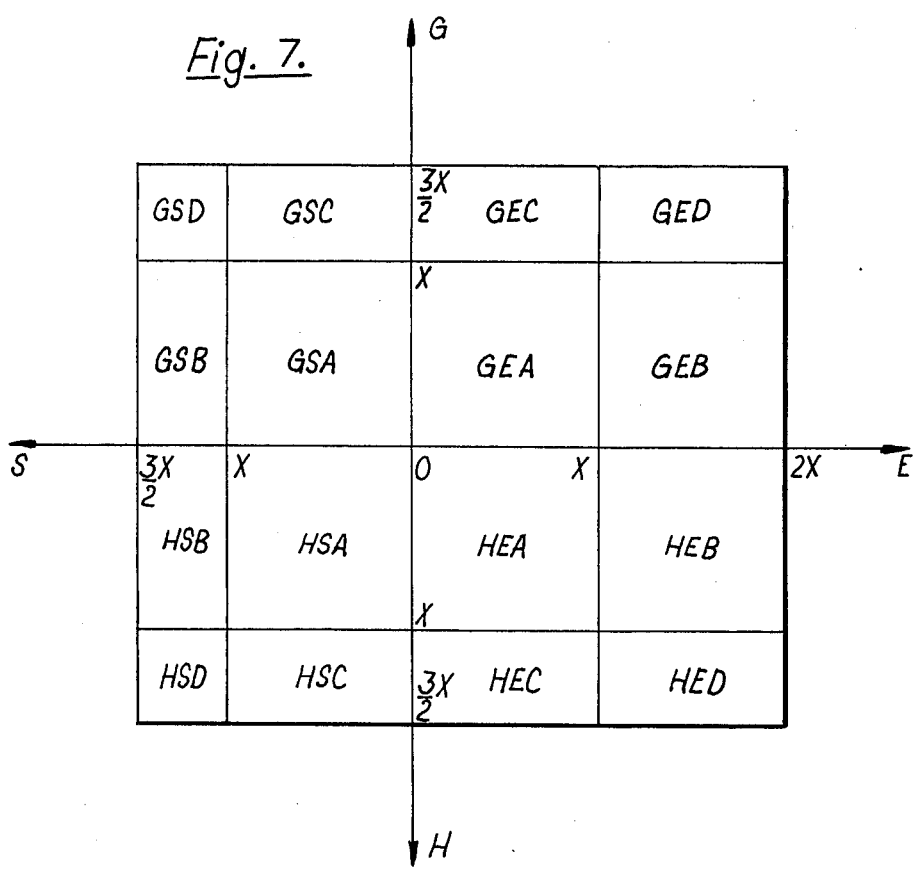
FIG. 7 is a diagram illustrating how selection units are distributed in a four-stage switching network.

Thus, FIG. 7 shows an example of an arrangement of stages of a network made of four different sizes. As hereabove mentioned, each selection unit is a thyristor.

Therefore, the first stage A includes X thyristors E, X thyristors S, X thysistors G and X thyristors H. Thus, stage A is assumed to theoretically process $X^3$ crosspoints, and has as many inputs as outputs.

The second stage B includes X thyristors E and (X/2) thyristors S. It utilizes the X thyristors G and the X thyristors H of stage A, and it has half as many outputs as inputs for concentration purposes, the number of inputs to B being obviously equal to the number of outputs of A.

The third stage C utilizes the X thyristors E and the X thyristors S of stage A. It has (X/2) thyristors G and (X/2) thyristors H. Thus, it has as many inputs as stage B has outputs, and as many inputs as outputs.

The fourth stage D utilizes the X thyristors E and the (X/2) thyristors S of stage B, and the (X/2) thyristors G and the (X/2) thyristors H of stage C. It has as many inputs as stage C has outputs, and half as many outputs as inputs.

As previously mentioned, the maximum number of crosspoints in a cubic matrix H is $X^3$. However, if X is a large number, for example of about 100, it is not possible to realize a winding made of 100 coils which could meet the conditions required for transmitting pulses. Particularly, the winding inductance limits the number of windings to a value $x << X$, and as a result the number of crosspoints in a row and a column is limited to x.

Figure 8:
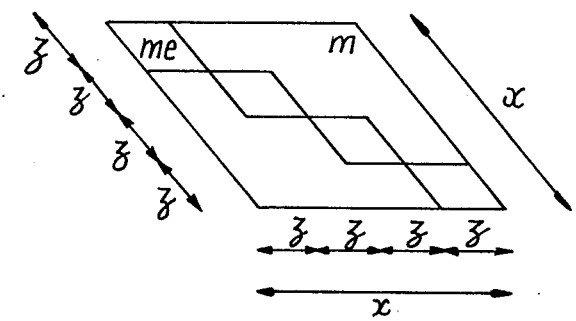
FIG. 8 is a diagram of an embodiment of a matrix plane illustrating a selected arrangement for elementary matrices.

Practically, matrix planes m, FIG. 5, are made by assembling elementary matrices me, those elementary matrices having, for example, x rows and x columns, or x rows and (x/2) columns, etc. Then, the matrix planes have an incomplete form and the elementary matrices are, for example, arranged along a diagonal of the plane, as shown in FIG. 8, which keeps the numbers X of rows and columns in the matrix plane.

Having defined the configuration of the properly said space-division switching network control system, the conditions which must be met to establish a path through such a network may be defined, taking into account that the switchings of the crosspoints constituting such a path are sequentially operated stage by stage, to the extent the network is a multistage network.

windings selection of a crosspoint is made through selection thyristors E, S, G, H which are connected to the winds of that crosspoint. For that purpose, each of those thyristors is previously fired and held in the on-condition.

The current needed for holding those thyristors, before control pulses are applied, is supplied from supplementary power supplies connected to thyristor anodes. Those supplementary power supplies supply a low current with respect to control pulse current so as to hold thyristors in on-condition without being able to disturb, even accidentally, crosspoint operation.

Figure 9:
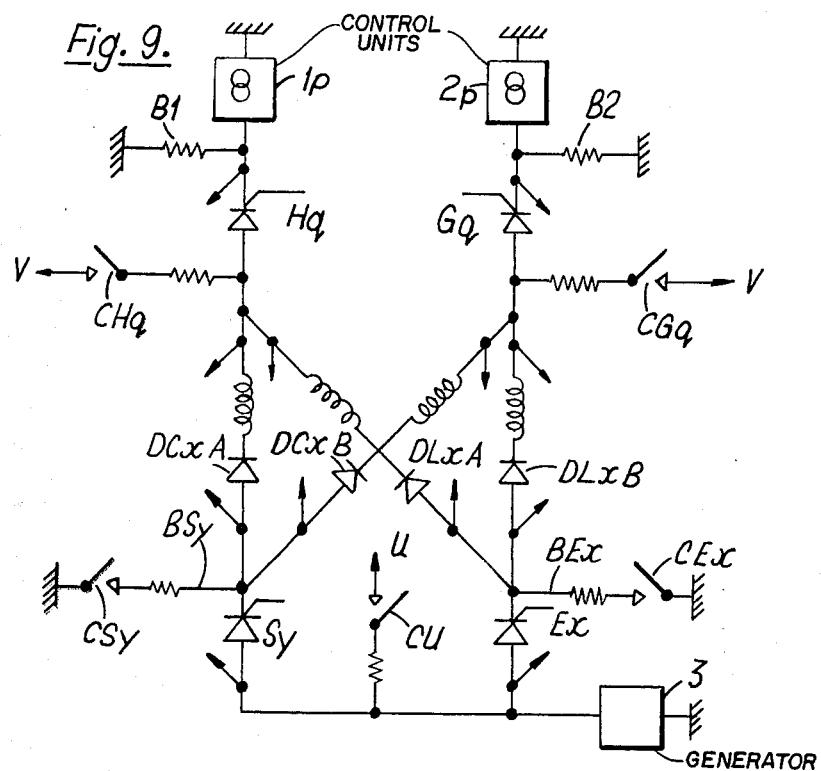
FIG. 9 is an electric circuit diagram of an embodiment of a control system according to this invention, for one crosspoint, control units being excluded.

FIG. 9 will be referred to in describing said control operations. For purposes of simplification, only one crosspoint has been shown together with respective circuits of the control system. Those control operations therefore include:

firing and holding of one of the two duration selection thyristors (G or H) which are connected to the windings of the crosspoint to be held, for example the thyristor Gq. That firing is conventionally triggered by means of the gate of Gq while a current is applied to a subsidiary circuit, that current being used later to hold the thyristor in on-condition, before receiving the related control pulse. The subsidiary circuit provided for the selection thyristors comprises a primary supplier V, a switch for connecting the supplier to the selected thyristor, and a holding branch providing electric circuit continuity. In the described embodiment, only one supply V is provided for all the thyristors G or H. An individual, so-called primary switch, is associated with each thyristor, such as the switch CGq for Gq, for thyristor providing the connection from supply V to the respective thyristor anode. A holding branch, such as B2, is connected in parallel to the switch to which the thyristor cathode is connected, such as B2 to switch 2p to which the cathode of Gq is connected. The holding branch has a resistance selected to limit thyristor holding current at which is sufficiently low with respect to control pulse current to avoid any disturbance, firing and holding the second duration selection thyristor (Hq in this example) according to an identical process and with identical means, firing and holding one of the two rank selection thyristors E or S which are connected to the windings of the crosspoints to be controlled, for example thyristor Ex. That firing is conventionally triggered through the gate of Ex while a current is supplied through a subsidiary circuit, which is different from the previously mentioned one, the provided current being then used as a thyristor holding current before pulse reception. The subsidiary circuit provided for rank selection thyristors E or S includes a supplementary power supply U, a switch for connecting supply U to thyristors, and an additional holding branch comprising a switch proper to the thyristor, which permits to provide the continuity of the established electric circuit, when it is in the on-condition. Supply U is common to all the thyristors E and S of a stage. It is connected to their anodes through a common switch CU. The additional holding branch, such as BEx or BSy, is alloted to a predetermined thyristor E or S, the individual so-called secondary switch being proper to the thyristor which the branch is alloted to, such as CSy or CEx to thyristors Sy and Ex, respectively, firing and holding the second rank selection thyristor (Sy in this example) according to an identical process and with identical means, simultaneous trigger of four control pulses through the four windings, each comprising one of the four coils of the crosspoint to be controlled so as to provide release of crosspoints having two coils into of the four actuated windings and to switch the selected crosspoint on.

Control units 1p and 2p trigger the current pulses provided from generator 3, when they are switched on, and sequentially switching off of those two circuits, causing short pulses to end through HEx and HSy and then long pulses to end through CSy and CEx.

In order to detect any possible failure in a unit included in the control system, this unit includes detectors designed for signalling the condition of the components associated thereto, which makes it possible to test and determine whether reached conditions are identical to controlled conditions, and, as a consequence to check the good operation of controlled control units and the continuity of control connections between those units All those operations are performed before each switching of a crosspoint so as to avoid foreseeable failures. In this respect, detectors deliver their outputs to computers designed for processing the switching network, those computers processing such outputs and deducing the appropriate consequences according to conventional processes, which will not be described herein.

The detectors utilized in the control system are conventional current detectors having a binary-type response. For instance, each of them may be constituted by a transistor inserted in the thyristor holding branch, the said transistor translating into its on- or off- condition the current flowing or not in the holding branch, respectively.

Figure 10:
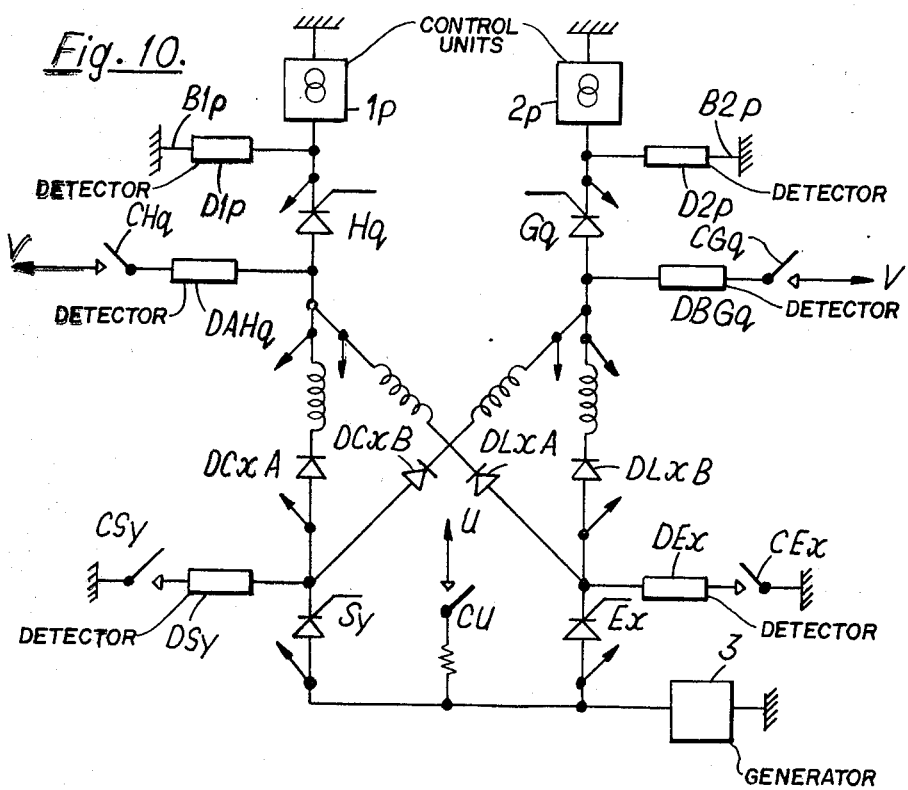
FIG. 10 is an electric circuit diagram of an embodiment of a control system according to this invention, for one crosspoint.

FIG. 10 shows how the dectectors are mounted. A first group of detectors has its elements respectively connected to selection thyristor cathodes and the second group has its elements respectively connected to rank selection thristor anodes.

For purposes of simplicity, the detectors are shown as serially connected in the subsidiary supply branches or holding branches.

Each detector of the first group is connected to a selection thyristor cathode; However, the selection detectors are associated to control units connected to duration selection thyristors G or H. Since, inside of a stage, there are only two control units such as 1p and 2p for stage p, and two holding branches, such as B1p for the X thyristors H of the stage and B1q for the X thristors G of the stage, there are therefore also two detectors per stage, such as Dip and D2p, one being connected to the cathodes of the X thyristors H of the stage and to unit 1p, and the other to cathodes of X thyristors G of the stage and to unit 2p. On the contrary, there are as many detectors, such as DEx, connected to the cathodes of thyristors E, as there are thyristors E in the non-duplicated control system, and as many detectors, such as DSy, connected to the cathodes of thyristors S as there are thyristors S in the non-duplicated control system.

The plurality of above-mentioned detectors form the first group. The second group comprises detectors connected to duration thyristor anodes and, therefore, to winding ends connected thereto. There are as many detectors as duration thyristors in the non-duplicated control system, that is twice the number of stages.

In a conventional manner, the control system is duplicated as a whole, except crosspoint coils and diodes serially connected with those coils, which accordingly increases the importance of the control concerning those windings and those diodes which, therefore, are the only elements capable of significantly influencing the good operation of the network due to their possible failures despite their high inherent reliability.

Checks made by means of detectors determine the procedure of a series of operations designed for previously controlling units and connections which are directly or indirectly concerned in the switching of a considered crosspoint.

The first operation consists in testing the operation blocking of the diodes serially connected to the windings, when a reverse voltage is applied to them. Indeed, when operating a crosspoint, the diodes connected to either one or the other of two duration selection thyristors have their cathodes biased by a positive potential, except diodes connected to the windings of the crosspoint to be controlled, a direct voltage being applied to these diodes between anode and cathode. If a reverse voltage is applied to a short-circuited diode, such diode can derive part of the control current through various pathes via the windings as already previously mentioned. That can be evidenced by considering FIG. 2. Indeed, if diode DC1A is short-circuited and assuming that the crosspoint P1y is to be switched, there may be an undesired current path from Sy, via winding HSy, winding HS1, short-circuited diode DC1A, diode DC1B, winding GS1, to thyristor G, that path being parallel to the normal current path from Sy, via winding GSy, to the same thyristor G. In this case, the undesired current is established at the end of the short pulse controlled by H and is reinforced by the second undesired current from E1.

Those undesired currents may randomly cause releases or connections and, therefore, communication breaks and several suscriber lines connected in parallel.

Such disturbances may affect any crosspoint wherever in a matrix plane which includes a short-circuited diode. Disturbances may also occur for any crosspoint having a coil connected, via its winding, to the same rank selection thyristor E or S as the winding including the short-circuited diode. Therefore, that affects a great number of crosspoints in the concerned stage, those points belonging either to the matrix plane including the failed winding diode, or to the same row or column rank in the various matrix planes of the stage.

FIG. 11 schematically shows those crosspoints concerned in a three-dimension matrix having X row, X columns and X matrix planes, when the winding including the short-circuited diode is connected to the rank thyristor S1 and belongs to plane mx, those crosspoints being indicated by hashed areas in FIG. 11.

It is necessary to suppress any utilization of the crosspoints located in the hashed areas, which corresponds to the need to release all communications utilizing a crosspoint in this area as soon as a short-circuited diode has been detected. Utilization of crosspoints located in the concerned areas and, therefore, links connected to those of them must also be prohibited. That may be achieved by making the disturbed links busy in the network processing computer memories.

In order to carry on that first operation check concerning winding diodes responsive to an inverse voltage, the voltage provided for supply V is applied to the cathodes of diodes DC and DL via primary concerned switches CH and CG, such as CGq and CHq (FIG. 10) when the crosspoint to be operated includes a coil in each of windings DCxA, DCxB, DLxA, DLxB, while the anodes or those diodes are connected, via tertiary concerned switches, such as CSy, CEx.

If a diode is short-circuited, on the one hand, the detector DAH of DBG, and, on the other hand, the detector DS or DE, which are serially connected to this diode, detect the occurrence of a current which allows the computers to identify the short-circuited diode by using means and processes which are not here described, so as to intervene according to the above described process. Thus, if diode DCxA is short-circuited, detectors DAHq and DSy are activated which makes it possible to identify the failed component. It must be understood that the check of the diodes relates to all the diodes of a stage, such an operation being carried on applying to all the diodes of a stage, a reverse voltage, during a same step, as it appears partially from FIG. 2.

Indeed, voltage V is applied to points I and J and the cathodes of rank thyristors E and S are grounded, with a result that all the diodes in the matrix plane can consequently be checked. Likely, the diodes of the windings having the same rank in their respective matrix planes as the windings including the coils of the crosspoint to be controlled, may be checked.

At the same time as diode reverse voltage operation is checked and if none of the diodes are short-circuited, the normal rest condition of all the detectors DAH, DBG, DS and DE is checked.

In case of good operation, the next step consists in checking the good operation of the first concerned duration selection thyristor, that is H in the described example (FIG. 10), when it is turned on.

For that purpose, thyristor Hq is fired and must hold after firing supply by the current from source V, via CHq, the current flowing through branch B1p. In case of good operation, detectors DAHq and D1p indicate the real holding, a negative indication from each of them resulting in resetting the thyristor which is signalled as a consequence thereof. A possible short-circuit of the control unit 1p associated to Hq results in a negative indication from detector D1p and a position indication from detector DAHq, which also permits to detect a possible failure in such a control unit.

In case of good operation, the next step consists in identically resuming the preceding step for the second concerned duration selection thyristor G, that is Gq.

In case of good operation, the next step consists in checking the good operation of the first concerned rank selection thyristor E or S, at the time it is fired.

For that purpose, the thyristor Ex, for instance, is fired and must hold due to the current supplied from source U, via circuit CU, such a current flowing through the associated holding branch and the connection circuit CEx. In case of good operation, detector DEx indicates the real holding.

The next step is purposed to control the continuity of the connections originating at the input operated selection thyristor and ending at the two output operated selection thyristors, vis the two controlled coils including the concerned crosspoing coils and the two diodes serially connected to those windings, which permits, in addition, to control the good direct-voltage diode operation.

For that purpose, connection circuits CGq, CHq, CEx are at rest and no longer make connection to ground or source V.

In case of good operation, a current from sourve U, via contact CU, flows through thyristor Ex, windings HEx and GEx, diodes DLxA and DLxB, each diode being respectively serially connected to a winding, thyristors Hq and Gq, being respectively serially connected to one of those diodes, and, finally, branches B1p and B2p. The operation is normally correct if both detectors D1p and D2p indicate the occurrence of a current. Any failure concerning the tested circuits results in a negative indication from at least one of the detectors and is then signalled as mentioned for the previous steps.

In case of good operation, the next step consists in checking the good operation of the second rank selection thyristor, that is Sy, of two other diodes and the continuity of the connections which include that thyristors, those diodes and the output selection thyristors Hq and Gq, after having reset the first previously tested input selection thyristor.

If the operation is still correct, the first input selection thyristor is fired again to enable control pulses to be sent. In case of switching of the considerec crosspoint, the control circuits 1p and 2p will then be simultaneously turned on.

Switching 1p on, then switching off previously to switching 2p off, result in the occurrence of two so-called short pulses from main generator 3 and flowing through thyristor Ex, diode DLxA, winding HEx and thyristor Hq, and the other through thyristor Sy, diode DCxA, winding HSy and thyristor Hq.

Switching 2p on, then switching it off result in the occurrence of two so-called long pulses from main generator 3 and flowing one through thyristor Ex, diode DLxB, winding GEx and thyristor Gq, and the other through thyristor Sy, diode DCxB, winding GSy and thyristor Gq.

While the principles of the present invention have been hereabove described in relation with a specific embodiment, it will be clearly understood that the said description has only been made by way of example and does not limit the scope of this invention.

What is claimed is:

1. A control system for a space-division multistage switching network, the network including a plurality of crosspoints arrayed in matrix planes in which each crosspoint has a rank in a particular row, i.e., a row rank and a rank in a particular column, i.e., a column rank, each crosspoint including four switching coils belonging to different categories, the coils being so arranged that coils of the same category of the various crosspoints in a row or a column of a matrix plane are connected to complete a row winding or a column winding having a row rank and a column rank, crosspoint switching being controlled by means of four pulses in the form of two pairs of pulses, pulses of a pair having the same value and the four pulses being applied to control the coils of the concerned crosspoint over the respective row winding and column winding, the said control system comprising:
- a plurality of winding selection units to select each winding when that winding is to be energized during crosspoint switching, means coupling two of said winding selection units respectively to different ends of the selected winding, one of said selection units being coupled to select a winding according to either the row rank or the column rank common to crosspoints whose coils form the concerned winding and the other one of said selection units being coupled to provide a switching pulse of selected value to the selected winding,
- each winding selection unit coupled to select a winding according to either a row rank or a column rank including a connection common to two windings respectively, including coils of different categories which are respectively located at a crosspoint in a matrix plane, those two windings being allotted to the rank of the crosspoint and including connections common to each pair of coils for a crosspoint of the same rank in each of the different matrix planes of a stage of the multi-stage switching network, and
- each winding selection unit coupled to provide a pulse of selected value is allotted to only one matrix plane in a stage and is connected, for each selection unit associated to that stage, to one of the two windings which are connected to that rank selection unit in the concerned matrix plane.

2. A control system according to claim 1, in which winding selection units are divided in two groups, one comprising rank selection units and the other comprising pulse value selection units, the said control system being characterized in that:
- selection units in a group are at least partially common to at least two stages of the network, and
- two stages of the network have in common at most selection circuits of only one group of selection circuits.

3. A control system according to claim 2, characterized by the fact that in at least one stage the same number of row rank selection units, column rank selection units, first pulse value selection units and second pulse value selection units are employed for selecting crosspoints switching coils included therein.

4. A control system according to claim 1, in which each selection circuit is a thyristor fired through its gate when a winding connected to one of its two other electrodes is selected, so as to pass the switching pulse to the said winding, via the said two other electrodes.

5. A control system according to claim 4, in which each coil is provided with a reverse current blocking diode serially mounted so as to permit the control pulse which normally is applied to the coil to flow whereby each crosspoint is held through magnetic means and wherein the first pulse value is different from the second one in its duration, the said system including:
- a current generator connected to the terminal of the rank selection thyristor which is not connected to coils, the said current generator supplying control pulse energy,
- two control units connected either to a first or second pulse value selection thyristor, each circuit controlling the control pulse, triggering time, pulse duration and current, the said control pulse passing through one of the selection circuits which the said control circuit is connected to when it has been actuated, each control circuit being allotted to a single pulse value,
- a first subsidiary power supply source connected to the anode of each of the pulse value selection thyristors through a switch coupled to the said thyristor so as to enable the said thyristor to be supplied by a low current, via a holding branch connected to its cathode when the said thyristor has been previously set before the control pulse passing therethrough, and
- a second subsidiary power supply source connected to the anode of each of the rank selection thyristors through at least a common switch so as to enable the said thyristor to be fed by a low current, via a holding branch connected to its cathode, when the said thyristor has been previously set before the control pulse passing therethrough.

6. A control system according to claim 5, in which a first current detector per selection thyristor is connected to the thyristor cathode, and a second current detector per pulse value selection thyristor is connected to the said thyristor anode.

7. A control process for a space-division multistage switching network, in which the network includes a plurality of crosspoints arrayed in a plurality of matrix planes, each crosspoint being equipped with four switching coils, each coil belonging to a different category, the coils being so arranged that coils of the same category of the various crosspoints in a row or a column of a matrix plane are connected to complete a row winding or a column winding depending on the configuration of the concerned crosspoints, crosspoint switching being controlled by means of four pulses in the form of two pairs of pulses, pulses of a pair having the same value and the four pulses being simultaneously applied to the coils of the concerned crosspoint, the control process including:
- firing each of four selection thyristors which are connected to the four coils of the crosspoint to be controlled and holding those thyristors by means of holding current flowing via respective anodes and cathodes, those holding currents being negligible with respect to pulses that were sent before them, and
- simultaneously triggering four current pulses, each being sent through a different winding and controlled in pairs by two control units each controlling the triggering time of a pair of pulses concerning the crosspoint to be controlled and the duration and current for the pair.

8. A control process for a control system according to claim 7, in which switching of crosspoints forming a path are distinctly made sequentially by stage, that is by crosspoint.

9. A control process according to claim 8, characterized by the fact that it includes, before switching of any crosspoint, a check step, by means of current detectors, of the operation of diodes serially connected to windings of the stage including the crosspoint, when those diodes are subject to a reverse voltage provided from a duly connected power supply source, so as to make it possible to suppress any traffic via the involved crosspoints, the operation of which may be disturbed by a short-circuited diode.

10. A control process according to claim 9, including the additional steps, before switching any crosspoint of:
   individually checking, first, the on-condition of each of the two fired pulse value selection thyristors by detecting the holding current passing therethrough by means of a first current detector associated thereto and, second, the operation blocking the control unit connected to the involved thyristor, individually checking, first, the on-condition of each of the two fired rank selection thyristors by detecting the holding current passing therethrough by means of the first current detector associated thereto and, second, the continuity of the connections estblished through the involved thyristor, the two windings connected to the crosspoint to be controlled, the diodes serially connected to those two windings, and the two involved pulse value selection thyristors connected to the said two windings, by means of said first current detector.

* * * * *